United States Patent
Mitsunobu et al.

(10) Patent No.: US 12,247,293 B2
(45) Date of Patent: Mar. 11, 2025

(54) HOT-DIP ZN-BASED PLATED STEEL SHEET

(71) Applicant: NIPPON STEEL CORPORATION, Tokyo (JP)

(72) Inventors: Takuya Mitsunobu, Tokyo (JP); Makoto Akahoshi, Tokyo (JP); Hiroshi Takebayashi, Tokyo (JP); Takehiro Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/041,919

(22) PCT Filed: Aug. 19, 2021

(86) PCT No.: PCT/JP2021/030412
§ 371 (c)(1),
(2) Date: Feb. 16, 2023

(87) PCT Pub. No.: WO2022/080004
PCT Pub. Date: Apr. 21, 2022

(65) Prior Publication Data
US 2024/0002991 A1 Jan. 4, 2024

(30) Foreign Application Priority Data
Oct. 16, 2020 (JP) ................. 2020-174453

(51) Int. Cl.
| | | |
|---|---|---|
| C23C 2/06 | (2006.01) | |
| B32B 15/01 | (2006.01) | |
| C21D 1/74 | (2006.01) | |
| C21D 1/84 | (2006.01) | |
| C21D 6/00 | (2006.01) | |
| C21D 9/46 | (2006.01) | |
| C22C 18/04 | (2006.01) | |
| C22C 38/02 | (2006.01) | |
| C22C 38/04 | (2006.01) | |
| C22F 1/02 | (2006.01) | |
| C22F 1/16 | (2006.01) | |
| C23C 2/28 | (2006.01) | |

(52) U.S. Cl.
CPC .............. *C23C 2/06* (2013.01); *B32B 15/013* (2013.01); *C21D 1/74* (2013.01); *C21D 1/84* (2013.01); *C21D 6/005* (2013.01); *C21D 6/008* (2013.01); *C21D 9/46* (2013.01); *C22C 18/04* (2013.01); *C22C 38/02* (2013.01); *C22C 38/04* (2013.01); *C22F 1/02* (2013.01); *C22F 1/165* (2013.01); *C23C 2/29* (2022.08)

(58) Field of Classification Search
CPC .............................. B32B 15/011; C22C 18/04
See application file for complete search history.

(56) References Cited

U.S. PATENT DOCUMENTS

| | | |
|---|---|---|
| 2019/0390303 A1 | 12/2019 | Tokuda et al. |
| 2020/0002798 A1 | 1/2020 | Tokuda et al. |
| 2021/0010106 A1 | 1/2021 | Kim et al. |

FOREIGN PATENT DOCUMENTS

| | | |
|---|---|---|
| JP | 4579715 B2 | 11/2010 |
| JP | 2015-214747 A | 12/2015 |
| WO | 2018/139619 A1 | 8/2018 |
| WO | 2019/132412 A1 | 7/2019 |

OTHER PUBLICATIONS

English translation of Tokuda et al. WO2018/139619 obtained form EPO espacenet Jun. 11, 2024 (Year: 2024).*

* cited by examiner

*Primary Examiner* — Adam Krupicka
(74) *Attorney, Agent, or Firm* — Renner, Otto, Boisselle & Sklar, LLP

(57) ABSTRACT

This hot-dip Zn-based plated steel sheet includes a steel sheet and a plating layer formed on at least part of a surface of the steel sheet, in which the plating layer has a chemical composition that includes, by mass %, Al: 6.00% to 35.00%, Mg: 2.00% to 12.00%, Ca: 0.005% to 2.00%, Si: 0% to 2.00%, Fe: 0% to 2.00%, Sb: 0% to 0.50%, Sr: 0% to 0.50%, Pb: 0% to 0.50%, Sn; 0% to 1.00%, Cu: 0% to 1.00%, Ti: 0% to 1.00%, Ni: 0% to 1.00%, Mn: 0% to 1.00%, Cr: 0% to 1.00%, and a remainder: Zn and impurities; the plating layer has an area ratio of a $MgZn_2$ phase in a range of 15% to 60% in a cross section in a thickness direction, and the $MgZn_2$ phase includes a Ca-based intermetallic compound having a circle equivalent diameter of 0.10 μm or smaller.

16 Claims, No Drawings

HOT-DIP ZN-BASED PLATED STEEL SHEET

TECHNICAL FIELD OF THE INVENTION

The present invention relates to a hot-dip Zn-based plated steel sheet.

This application claims the right of priority based on Japanese Patent Application No. 2020-174453 filed with the Japan Patent Office on Oct. 16, 2020, the content of which is incorporated herein by reference.

RELATED ART

In recent years, in order to protect the global environment, there has been a demand for improved fuel efficiency in vehicles. With regard to the improvement of the fuel efficiency in vehicles, in order to reduce the weight of a vehicle body while securing collision resistance performance, the application of high strength steel sheets is progressing for steel sheets that are used for vehicle components (steel sheets for vehicles).

However, in a case where there is a concern about a reduction in sheet thickness or perforation due to corrosion, there is a case where it is not possible to reduce the thickness to a certain thickness or less even if the strength is increased. One of the purposes of high-strengthening of a steel sheet is to reduce the weight by making the steel sheet thinner, and therefore, even if a high strength steel sheet is developed, its application is limited if the corrosion resistance is low.

Even at present, from the viewpoint of improving corrosion resistance, plated steel sheets, especially hot-dip galvanized steel sheets, are often applied to steel sheets for vehicles. However, with respect to high strength steel sheets which are being made stronger, the demand for improved corrosion resistance is increasing in order to avoid concerns about a reduction in sheet thickness due to corrosion.

In particular, in the steel sheets for vehicles, the plated steel sheet is further subjected to chemical conversion treatment and electrodeposition coating for vehicles to improve corrosion resistance. However, there is a problem in that even after the chemical conversion treatment and the electrodeposition coating, at a cut end surface portion, its corrosion resistance (end surface corrosion resistance) is lower than that of a flat portion.

For example, Patent Document 1 discloses a hot-dip Al—Zn plated steel sheet that contains, by mass %, Al: 25% to 90%, and Sn: 0.01% to 10%, and further has a plating layer that contains 0.01% to 10% in total of one or more selected from the group consisting of Mg, Ca, and Sr.

However, in Patent Document 1, although there is a certain effect in improving the corrosion resistance after painting, which is evaluated by the maximum coating film swelling width from the cross-cut scratch after the accelerated corrosion test at 60 cycles or 120 cycles, the improvement of the end surface corrosion resistance is not targeted. As a result of studies by the inventors of the present invention, it has been found that the technology of Patent Document 1 cannot be said to be effective for improving end surface corrosion resistance.

Further, Patent Document 2 discloses a chemical conversion steel sheet superior in corrosion resistance, coating film adhesion, and adhesiveness, in which a hot-dip Zn—Al—Mg alloy plated steel sheet in which a ratio of [ternary eutectic structure of Al/Zn/$Zn_2Mg$] occupying the outermost surface of a plating layer is 60 area % or more is used as a substrate, a plating layer surface is covered with a precipitation layer containing at least one selected from Ni, Co, Fe, and Mn, in which a total adhesion amount of Ni, Co, and Fe is in a range of 0.05 to 5.0 mg/m$^2$ and an adhesion amount of Mn is in a range of 0.05 to 30 mg/m$^2$, a phosphate film consisting of phosphate crystals with an average grain size in a range of 0.5 to 5.0 μm, and a chemical conversion film in which a valve metal oxides or hydroxides and a valve metal fluorides coexist, a base portion of the phosphate crystal bites into the plating layer and stands up from the plating layer, and the chemical conversion film is an organic resin film through an interfacial reaction layer formed at an interface with the plating layer exposed between the phosphate crystals or the precipitation layer. Patent Document 2 also discloses that this chemical conversion steel sheet has exceptional corrosion resistance after painting.

However, the chemical conversion steel sheet of Patent Document 2 is premised on having a chemical conversion film, and in a plated steel sheet that does not have a chemical conversion film, it cannot be said that sufficient corrosion resistance can be obtained. Further, it is difficult to apply it to steel sheets for vehicles which need to have a special chemical conversion film and which need to perform chemical conversion treatment for a vehicle.

PRIOR ART DOCUMENT

Patent Document

[Patent Document 1] Japanese Unexamined Patent Application, First Publication No. 2015-214747
[Patent Document 2] Japanese Patent No. 4579715

DISCLOSURE OF THE INVENTION

Problems to be Solved by the Invention

The present invention has been made in view of the above problems. However, steel sheets that are used for vehicle components are also required to have sufficient workability because they are subjected to working when they are made into components. Therefore, even if corrosion resistance is exceptional, if the workability is not sufficient, the application becomes difficult.

Therefore, the present invention has an object to provide a hot-dip Zn-based plated steel sheet that has workability equal to or greater than that of a vehicle plated steel sheet of the related art and that is superior in end surface corrosion resistance to that of the vehicle plated steel sheet of the related art.

Means for Solving the Problem

The inventors of the present invention have investigated the improvement of end surface corrosion resistance after electrodeposition coating in a hot-dip Zn-based plated steel sheet. As a result, the inventors have found that in a case where a plating layer contains Al, Mg, and Ca and has a predetermined structure, the end surface corrosion resistance after electrodeposition coating is improved.

The present invention has been made based on the above findings. The gist of the present invention is as follows.

[1] A hot-dip Zn-based plated steel sheet according to an aspect of the present invention includes a steel sheet and a plating layer formed on at least part of a surface of the steel sheet, in which the plating layer has a chemical composition that includes, by mass %, Al: 6.00% to 35.00%, Mg: 2.00% to 12.00%, Ca: 0.005% to 2.00%, Si: 0% to 2.00%, Fe: 0% to 2.00%, Sb: 0% to 0.50%, Sr: 0% to 0.50%, Pb: 0% to 0.50%, Sn: 0% to 1.00%, Cu: 0% to 1.00%, Ti: 0% to 1.00%, Ni: 0% to 1.00%, Mn: 0% to 1.00%, Cr: 0% to 1.00%, and a remainder: Zn and impurities, the plating layer has an area ratio of a $MgZn_2$ phase in a range of 15% to 60% in a cross section in a thickness direction, and the $MgZn_2$ phase includes a Ca-based intermetallic compound having a circle equivalent diameter of 0.10 μm or smaller.

[2] In the hot-dip Zn-based plated steel sheet according to the above [1], the chemical composition of the plating layer may contain one or more selected from the group consisting of, by mass %, Al: 11.00% to 30.00%, Mg: 5.00% to 10.00%, and Ca: 0.10% to 1.00%.

[3] In the hot-dip Zn-based plated steel sheet according to the above [1] or [2], a number density of the Ca-based intermetallic compound that is included in the $MgZn_2$ phase may be 10 pieces/$μm^2$ or more.

[4] In the hot-dip Zn-based plated steel sheet according to any one of the above [1] to [3], an alloy layer that includes an Al—Fe-based intermetallic compound and has an average thickness in a range of 0.05 to 3.0 μm may be provided between the plating layer and the steel sheet.

[5] In the hot-dip Zn-based plated steel sheet according to any one of the above [1] to [3], the steel sheet may have an internal oxidation layer in a surface layer area on a side of the plating layer.

[6] In the hot-dip Zn-based plated steel sheet according to the above [4], the steel sheet may have an internal oxidation layer in a surface layer area on a side of the alloy layer.

Effects of the Invention

According to the above aspect of the present invention, it is possible to provide a hot-dip Zn-based plated steel sheet that has sufficient workability and exceptional end surface corrosion resistance.

EMBODIMENTS OF THE INVENTION

A hot-dip Zn-based plated steel sheet according to an embodiment of the present invention (hereinafter referred to as a plated steel sheet according to the present embodiment) includes a steel sheet, and a plating layer formed on at least part of the surface of the steel sheet and having a predetermined chemical composition.

Further, the plating layer has an area ratio of a $MgZn_2$ phase in a range of 15% to 60% in a cross section in a thickness direction, and the $MgZn_2$ phase contains a Ca-based intermetallic compound having a circle equivalent diameter of 0.10 μm or smaller.

The plated steel sheet according to the present embodiment may have an alloy layer that includes an intermetallic compound containing Fe and Al and is provided between the steel sheet and the plating layer.

A detailed description will be given below.

<Steel Sheet>

In the plated steel sheet according to the present embodiment, the plating layer is important, and the type of the steel sheet is not particularly limited. It may be determined according to a product to be applied, required strength, a sheet thickness, or the like. For example, a hot-rolled steel sheet described in JIS G3193:2008 or a cold-rolled steel sheet described in JIS G3141:2017 can be used.

The steel sheet is preferably a steel sheet having an internal oxidation layer in a surface layer area on the side of the plating layer (the interface side between the steel sheet and the plating layer) (a surface layer area on the side of the alloy layer (the interface side between the steel sheet and the alloy layer) in a case where an alloy layer (described later) is formed between the steel sheet and the plating layer).

The internal oxidation layer is formed by annealing a steel sheet before plating in a predetermined atmosphere. Due to the presence of the internal oxidation layer in the steel sheet, the effect of promoting the formation of the $MgZn_2$ phase in which the Ca-based intermetallic compound is dispersed is obtained. In a case of obtaining this effect, the thickness of the internal oxidation layer is preferably in a range of 0.1 to 8.0 μm.

[Alloy Layer]

The plated steel sheet according to the present embodiment may have an alloy layer formed between the steel sheet and the plating layer. The formation of the alloy layer is preferable because the adhesion between the steel sheet and the plating layer is improved. In a case of obtaining the above effect, the average thickness of the alloy layer is preferably in a range of 0.05 to 3.0 μm.

The alloy layer includes an Al—Fe-based intermetallic compound (for example, an Al—Fe alloy or an Al—Fe—Si alloy in a case where the plating layer contains Si). The alloy layer is an intermetallic compound mainly composed of Al and Fe, which is formed by reaction of Al and Fe in the plating layer by heat treatment. In the present embodiment, a layer containing 30% or more of Al and 30% or more of Fe and located between the steel sheet and the plating is the alloy layer. There is a case where this alloy layer contains 20% or less of each of Si and Zn contained in the plating layer.

The presence or absence and thickness of the alloy layer can be obtained by measuring the thickness of the Al—Fe-based intermetallic compound from an element distribution image obtained from the EDS measurement.

<Plating Layer>

The plated steel sheet according to the present embodiment has the plating layer on at least part of the surface of the steel sheet. The plating layer may be formed on one side of the steel sheet or may be formed on both sides.

The adhesion amount of the plating layer is preferably in a range of 15 to 250 g/$m^2$.

[Chemical Composition]

The chemical composition of the plating layer of the plated steel sheet according to the present embodiment will be described. "%" of the content of each element means mass %. Further, the numerical value range shown to have the word "to" therein includes the values at both ends as the upper and lower limits.

Al: 6.00% to 35.00%

Al is an effective element for securing the end surface corrosion resistance in the plating layer that includes aluminum (Al), zinc (Zn), and magnesium (Mg). Further, Al is also an element that contributes to the formation of the alloy layer (Al—Fe alloy layer) and is effective in improving plating adhesion. In order to sufficiently obtain the above effects, the Al content is set to 6.00% or more. The Al content is preferably 11.00% or more.

On the other hand, if the Al content exceeds 35.00%, the area ratio of an (Al—Zn) dendrite increases, a Ca-based intermetallic compound is not formed in the $MgZn_2$ phase, and the end surface corrosion resistance of the plating layer is lowered. Therefore, the Al content is set to 35.00% or less. The Al content is preferably 30.00% or less.

Mg: 2.00% to 12.00%

Mg is an element that has the effect of improving the end surface corrosion resistance of the plating layer. In order to sufficiently obtain the above effect, the Mg content is set to 2.00% or more.

On the other hand, if the Mg content exceeds 12.00%, the end surface corrosion resistance is lowered and the workability of the plating layer is lowered. Further, a manufacture problem arises, such as an increase in the amount of dross generated in a plating bath. Therefore, the Mg content is set to 12.00% or less. The Mg content is preferably 11.00% or less, and more preferably 10.00% or less.

Ca: 0.005% to 2.00%

Ca is an element necessary for forming the Ca-based intermetallic compound. In the plated steel sheet according to the present embodiment, the Ca content is set to 0.005% or more in order to form the Ca-based intermetallic compound in the $MgZn_2$ phase. The Ca content is preferably 0.01% or more, and more preferably 0.10% or more. Further, Ca is also an element that reduces the amount of dross that is easily formed during a plating operation according to an increase in Mg content and contributes to the improvement of plating manufacturability.

On the other hand, if the Ca content exceeds 2.00%, Ca crystallizes as a coarse intermetallic compound, resulting in a decrease in workability. Therefore, the Ca content is set to 2.00% or less. The Ca content is preferably 1.00% or less.

Si: 0% to 2.00%

Si is an element that forms a compound together with Mg and contributes to the improvement of the end surface corrosion resistance. Further, Si is also an element that has the effect of suppressing the formation of an excessively thick alloy layer between the steel sheet and the plating layer, thereby increasing the adhesion between the steel sheet and the plating layer when forming the plating layer on the steel sheet. Therefore, Si may be contained. In a case of obtaining the above effect, the Si content is preferably 0.10% or more. The Si content is more preferably 0.20% or more.

On the other hand, if the Si content exceeds 2.00%, excessive Si crystallizes in the plating layer, resulting in a decrease in end surface corrosion resistance and a decrease in workability of the plating layer. Therefore, the Si content is set to 2.00% or less. The Si content is more preferably 1.50% or less. Si does not need to be necessarily contained, and the lower limit is 0%.

Fe: 0% to 2.00%

Fe is mixed into the plating layer as an impurity when manufacturing the plating layer. Although it may be contained up to about 2.00%, the adverse effect on the properties of the plated steel sheet according to the present embodiment is small within this range. Therefore, it is preferable to set the Fe content to 2.00% or less. The Fe content is more preferably 1.50% or less, and still more preferably 1.00% or less.

The Fe content may be 0%. However, since it is not easy to reduce the Fe content to 0%, the Fe content may be set to 0.10% or more.

The chemical composition of the plating layer of the plated steel sheet according to the present embodiment is based on the chemical composition described above, with a remainder being Zn and impurities. The impurity content is preferably 5.0% or less, and more preferably 3.0% or less.

However, the plating layer of the plated steel sheet according to the present embodiment may further contain, for example, Sb, Sr, Pb, Sn, Cu, Ti, Ni, Mn, and Cr in the following ranges, instead of part of Zn. Since these elements do not need to be necessarily contained, the lower limit of the content is 0%. Further, even if these elements are contained at impurity levels, they do not substantially affect the properties of the plating layer.

Sb: 0% to 0.50%
Sr: 0% to 0.50%
Pb: 0% to 0.50%

If Sr, Sb, and Pb are contained in the plating layer, the external appearance of the plating layer changes, and spangles are formed, so that an improvement in metallic gloss is confirmed. Therefore, one or more of Sr, Sb, and Pb may be contained. In a case of obtaining the above effect, the content of one or more of Sr, Sb, and Pb is preferably 0.001% or more, or 0.01% or more.

On the other hand, if the content of these elements exceeds 0.50%, various intermetallic compounds are formed, degrading workability and corrosion resistance. Further, if the content of these elements becomes excessive, the viscosity of the plating bath increases, and the preparation of the plating bath itself often becomes difficult, making it impossible to manufacture a plated steel sheet with good plating properties. Therefore, even in a case where they are contained, the Sr content is set to 0.50% or less, the Sb content is set to 0.50% or less, and/or the Pb content is set to 0.50% or less.

Sn: 0% to 1.00%

Sn is an element that increases a Mg elution rate in a plating layer that includes Zn, Al, and Mg. If the Mg elution rate increases, sacrificial protection property is improved, and the corrosion resistance is improved. Therefore, Sn may be contained.

On the other hand, if the Mg elution rate becomes excessive, the corrosion resistance rather decreases. Therefore, even in a case where it is contained, the Sn content is set to 1.00% or less.

Cu: 0% to 1.00%
Ti: 0% to 1.00%
Ni: 0% to 1.00%
Mn: 0% to 1.00%
Cr: 0% to 1.00%

These elements are elements that contribute to the improvement of corrosion resistance. Therefore, they may be contained. In a case of obtaining the above effect, the content of one or more of these elements is preferably set to 0.001% or more, or 0.01% or more.

On the other hand, if the content of these elements becomes excessive, the viscosity of the plating bath increases, and the preparation of the plating bath itself often becomes difficult, making it impossible to manufacture a plated steel sheet with good plating properties. Therefore, even in a case where they are contained, the content of each element is set to 1.00% or less.

The chemical composition of the plating layer is measured by the following method.

First, an acid solution is obtained by peeling and dissolving the plating layer with an acid containing an inhibitor that suppresses the corrosion of a base metal (steel). Next, by measuring the obtained acid solution by ICP analysis, the chemical composition of the plating layer (in a case where the alloy layer is formed between the plating layer and the steel sheet, although the chemical composition is the sum of the plating layer and the alloy layer, the alloy layer is thin, so the effect is small) can be obtained. The acid species is not particularly limited as long as it is an acid capable of dissolving the plating layer. The chemical composition is measured as an average chemical composition.

[Structure]

In the cross section in the thickness direction, the area ratio of the $MgZn_2$ phase is in a range of 15% to 60%, and the $MgZn_2$ phase includes a Ca-based intermetallic compound having a circle equivalent diameter of 0.10 μm or smaller.

The inventors of the present invention have investigated the improvement of the end surface corrosion resistance after electrodeposition coating in a hot-dip Zn-based plated steel sheet having a plating layer that includes Al, Mg, and Ca as described above. As a result, the inventors have found that the end surface corrosion resistance after electrodeposition coating is improved in a case where the plating layer has a predetermined structure.

Specifically, it was found that the end surface corrosion resistance is improved when the area ratio of the $MgZn_2$ phase in which the Ca-based intermetallic compound is dispersed is in a range of 15% to 60% in the cross section in the thickness direction of the plating layer.

Therefore, in the plated steel sheet according to the present embodiment, the area ratio of the $MgZn_2$ phase is set to be in a range of 15% to 60% in the cross section of the plating layer, and the $MgZn_2$ phase is made so as to include a Ca-based intermetallic compound having a circle equivalent diameter of 0.10 µm or smaller.

Here, in the present embodiment, the $MgZn_2$ phase including a Ca-based intermetallic compound having a circle equivalent diameter of 0.10 µm or smaller means that the Ca-based intermetallic compounds of 1 piece/µm$^2$ or more are present in the $MgZn_2$ phase.

Further, the Ca-based intermetallic compound is a compound containing 8 to 15 at % of Al, 8 to 15 at % of Ca, 70 to 84 at % of Zn, and 0 to 5 at % of Si, and having a trigonal crystal structure.

The reason why the $MgZn_2$ phase that includes a Ca-based intermetallic compound improves the end surface corrosion resistance is not clear. However, it is considered that this is because a fine Ca-based intermetallic compound promotes the elution of Mg from the $MgZn_2$ phase, which is a primary phase and improves the sacrificial protection property.

In a case where the area ratio of the $MgZn_2$ phase is less than 15% or in a case where a Ca-based intermetallic compound of 0.10 µm or less is not included in the $MgZn_2$ phase even if the area ratio of the $MgZn_2$ phase is 15% or more, a sufficient effect is not obtained.

On the other hand, in a case where the area ratio of the $MgZn_2$ phase that includes the Ca-based intermetallic compound having a circle equivalent diameter of 0.10 µm or smaller exceeds 60%, workability is lowered, which is not preferable.

The number density of the Ca-based intermetallic compound that is included in the $MgZn_2$ phase is preferably 5 pieces/µm$^2$ or more, and more preferably 10 pieces/µm$^2$ or more.

Since it is preferable that the Ca-based intermetallic compound is finer, it is preferable that the $MgZn_2$ phase includes 1 piece/µm$^2$ or more of the Ca-based intermetallic compound having a circle equivalent diameter of 0.07 µm or smaller.

In the plating layer of the plated steel sheet according to the present embodiment, the phases other than the $MgZn_2$ phase are not limited. However, for example, an (Al—Zn) phase composed of Al and Zn, a Zn/Al/$MgZn_2$ ternary eutectic structure, a $Mg_2Si$ phase, and/or other intermetallic compounds may be included.

From the viewpoint of workability, it is preferable that the area ratio of the (Al—Zn) phase is in a range of 30% to 70%, the area ratio of the $Mg_2Si$ phase is in a range of 8.0% or less, and the area ratios of other intermetallic compounds are 10.0% or less. Further, other intermetallic compounds preferably have a circle equivalent diameter of 5 µm or smaller.

The area ratio of each phase in the cross section of the plating layer is obtained by the following method.

A sample with a size of 25 mm in the direction perpendicular to a rolling direction×15 mm in the rolling direction is taken from the plated steel sheet, embedded in resin such that the thickness direction of the plating layer of this sample is an observed section, and polished, and a cross-sectional SEM image of this plating layer and an element distribution image by EDS are obtained. The area ratios of the $MgZn_2$ phase, the Zn/Al/$MgZn_2$ ternary eutectic structure, the (Al—Zn) dendrite, and other intermetallic compounds in the plating layer are measured based on the SEM image and the element distribution image. In the present embodiment, the cross-sectional EDS mapping images of the plating layer are taken from five different samples at a total of 5 visual fields (magnification: 1500 times), each of which is one visual field (180 µm×150 µm), and with respect to each phase, the average value of the area ratios obtained at the five visual fields is set to be the area ratio of each phase.

Further, the number density of the Ca-based intermetallic compound is obtained by the following method.

A thin sample for TEM observation is fabricated from the plating layer of the plated steel sheet, and a TEM-EDS mapping image is obtained with respect to the $MgZn_2$ phase contained in the cross section of the plating layer. The position where Ca exists is determined to be a Ca-based intermetallic compound, the number of Ca-based intermetallic compounds having a circle equivalent diameter of 0.10 µm or smaller or 0.07 µm or smaller, which is contained in the visual field, is counted, and the number density of the Ca-based intermetallic compound of each size is calculated based on the measured area. However, in consideration of measurement accuracy, the intermetallic compounds with a size of 0.001 µm or larger are counted.

<Manufacturing Method>

Next, a preferred method for manufacturing the plated steel sheet according to the present embodiment will be described. The plated steel sheet according to the present embodiment can obtain the effect thereof regardless of a manufacturing method as long as it has the above characteristics. However, according to the following method, since the steel sheet can be stably manufactured by the method, it is preferable.

The steel sheet according to the present embodiment can be manufactured by a manufacturing method that includes the following steps (I) to (III):

(I) a plating step of immersing the steel sheet in a plating bath containing Al, Mg, and Zn, (II) a cooling step of cooling the steel sheet (plated steel sheet) after the immersion in the plating bath such that the average cooling rate from the plating bath temperature to the temperature of 20° C. is 15° C./sec or faster, and (III) a post-heat treatment step of heating the plated steel sheet after the cooling step to a temperature range of 100° C. to 220° C.

The steel sheet to be subjected to the plating step is not particularly limited, and as long as it is a steel sheet (a hot-rolled steel sheet or a cold-rolled steel sheet) obtained by a known method, it may be adopted.

The steel sheet may be annealed prior to the plating step. In a case where annealing is performed, the annealing conditions may be known conditions, and the condition in which heating is performed to a temperature of 750° C. to 900° C. in a 5% $H_2$-$N_2$ gas atmosphere with a dew point of −10° C. or higher and is retained for 30 to 240 seconds is exemplified. In a case where an internal oxidation layer is formed in the steel sheet, it is preferable to set the annealing temperature to a temperature in a range of 800° C. to 870° C. and the annealing time to a time in a range of 60 to 130 seconds in the above atmosphere. If the annealing temperature is lower than 800° C., the internal oxidation layer is not sufficiently formed, and if the annealing temperature is higher than 870° C., it becomes difficult to control the internal oxidation layer to a desired thickness. If the annealing time is shorter than 60 seconds, there is a concern that the thickness of the internal oxidation layer may not be sufficiently maintained, and in a case where the annealing time is longer than 130 seconds, there is a concern that the internal oxidation layer may exceed 8.0 μm and become too thick.

[Plating Step]

In the plating step, the steel sheet is immersed in a plating bath to form a plating layer. In a case where annealing is performed prior to the plating step, the steel sheet may be immersed in a plating bath in a temperature-fall process after annealing. Since the composition of the plating bath is substantially the same as the composition of the plating layer to be formed, the plating bath may be adjusted according to the composition of the plating layer to be formed.

[Cooling Step]

In the cooling step, the plating adhesion amount of the steel sheet after immersion in the plating bath (a steel sheet with a plating layer on the surface) is adjusted with a wiping gas such as $N_2$, and then cooling is performed such that the average cooling rate from the plating bath temperature to 20° C. is 15° C./sec or faster.

Due to this cooling, Ca is subjected to solid solution to the $MgZn_2$ phase that is crystallized in a solidification process. Ca that is solid-dissolved at this stage is precipitated in the post-heat treatment (described later).

If the average cooling rate from the plating bath temperature to 20° C. is slower than 15° C./sec, the solid solution of Ca to the $MgZn_2$ phase is insufficient, and even if the post-heat treatment is performed, a predetermined Ca-based intermetallic compound is not obtained.

It is not necessary to limit the upper limit of the average cooling rate. However, it may be 60° C./sec or slower.

Further, more specifically, in a case where a finer Ca-based intermetallic compound having a circle equivalent diameter of 0.07 μm or smaller is precipitated, it is preferable that the average cooling rate from the plating bath temperature to 20° C. is set to 15° C./sec or faster and the average cooling rate from 270° C. to 20° C. is set to 30° C./sec or faster. By setting the average cooling rate from 270° C. to 20° C. to 30° C./sec or faster, the $MgZn_2$ phase becomes finer and the solid solution of Ca to the $MgZn_2$ phase becomes sufficient. Therefore, the Ca-based intermetallic compound that is precipitated during the subsequent post-heat treatment becomes finer.

In a case where in the plating structure, the area ratio of the (Al—Zn) phase is set to 30% to 70%, the average cooling rate from the bath temperature to 300° C. is preferably set to 20 to 40° C./sec.

[Post-heat Treatment Step]

In the post-heat treatment step, the plated steel sheet after the cooling step is heated to a temperature range of 100° C. to 220° C. (post-heat treatment). According to this post-heat treatment, Ca solid-dissolved to the $MgZn_2$ phase is finely precipitated in the $MgZn_2$ phase as an intermetallic compound. As a result, the $MgZn_2$ phase includes a Ca-based intermetallic compound having a circle equivalent diameter of 0.10 μm or smaller.

In a case where the post-heat treatment is not performed or the post-heat treatment temperature (heating temperature) is lower than 100° C., the Ca-based intermetallic compound does not precipitate. On the other hand, in a case where the post-heat treatment temperature is higher than 220° C., the temperature is too high, so that a sufficient driving force for nucleation is not obtained and the Ca-based intermetallic compound does not precipitate.

In a case of efficiently precipitating the Ca-based intermetallic compound and further improving the end surface corrosion resistance, the post-heat treatment temperature is preferably 150° C. or lower. Although the details of the cause are not clear, it is considered that it is because, if the temperature is 150° C. or lower, a sufficient driving force for the precipitation of the Ca-based intermetallic compound can be obtained and the precipitated Ca-based intermetallic compound becomes finer.

After heating to a temperature in a range of 100° C. to 220° C., a retention time in the temperature range is not limited. However, it is preferably 30 seconds or longer in a case where the Ca-based intermetallic compound is sufficiently precipitated. Further, if the retention time is longer than 10 minutes, since the productivity is lowered, it is preferable that the retention time is 10 minutes or shorter.

The post-heat treatment step is performed within 48 hours from the completion of the cooling step. This is because, if the time from the cooling step to the post-heat treatment is too long, Ca in the plating layer is stabilized and becomes difficult to precipitate into the $MgZn_2$ phase by the post-heat treatment.

According to the manufacturing method described above, the plated steel sheet according to the present embodiment is obtained.

EXAMPLES

A cold-rolled steel sheet (0.2% C-2.0% Si-2.3% Mn) having a sheet thickness of 0.8 mm was prepared as a steel sheet to be plated.

After this steel sheet is cut into a size of 100 mm×200 mm, then annealing and hot-dip plating were performed using a batch-type hot-dip plating tester.

In the annealing, annealing was performed at 860° C. for 120 seconds in an atmosphere that includes gas containing 5% $H_2$ gas and $N_2$ gas as a remainder and has a dew point of 0° C., in a furnace having oxygen concentration of 20 ppm or lower.

After the annealing, the steel sheet was air-cooled with $N_2$ gas, and when the steel sheet temperature reached the bath temperature+20° C., it was immersed in a plating bath having a bath temperature shown in Table 1 for about 3 seconds. The composition of the plating bath and the composition of the formed plating layer were as shown in Table 1.

The plated base sheet with the plating layer formed thereon was cooled to a temperature of 20° C. or lower under the conditions shown in Table 1, and subjected to post-heat treatment to obtain a plated steel sheet (a hot-dip Zn-based plated steel sheet). The retention time of the post-heat treatment was set to 100 seconds. The time from the completion of the cooling step to the start of the post-heat treatment was set as shown in Table 1.

TABLE 1

| | | Manufacturing method | | | | |
|---|---|---|---|---|---|---|
| | | | Cooling condition | | | |
| No. | Classification | Bath temperature (° C.) | Average cooling rate from bath temperature to 20° C. (° C./s) | Average cooling rate from bath temperature to 270° C. (° C./s) | Average cooling rate from 270° C. to 20° C. (° C./s) | Post-Heat treatment Presence or absence |
| 1 | Comparative example | 480 | 20.0 | 20.0 | 20.0 | Presence |
| 2 | Comparative example | 480 | 20.0 | 20.0 | 20.0 | Presence |
| 3 | Invention example | 420 | 20.0 | 20.0 | 20.0 | Presence |
| 4 | Invention example | 420 | 20.0 | 20.0 | 30.0 | Presence |
| 5 | Comparative example | 460 | 20.0 | 20.0 | 20.0 | Presence |
| 6 | Invention example | 460 | 20.0 | 20.0 | 20.0 | Presence |
| 7 | Invention example | 460 | 24.7 | 20.0 | 30.0 | Presence |
| 8 | Invention example | 470 | 20.0 | 20.0 | 20.0 | Presence |
| 9 | Invention example | 480 | 20.0 | 20.0 | 20.0 | Presence |
| 10 | Invention example | 480 | 24.4 | 20.0 | 30.0 | Presence |
| 11 | Invention example | 480 | 20.0 | 20.0 | 20.0 | Presence |
| 12 | Comparative example | 520 | 20.0 | 20.0 | 20.0 | Presence |
| 13 | Invention example | 500 | 20.0 | 20.0 | 20.0 | Presence |
| 14 | Invention example | 500 | 24.2 | 20.0 | 30.0 | Presence |
| 15 | Invention example | 500 | 20.0 | 20.0 | 20.0 | Presence |
| 16 | Invention example | 550 | 20.0 | 20.0 | 20.0 | Presence |
| 17 | Comparative example | 520 | 20.0 | 20.0 | 20.0 | Presence |
| 18 | Comparative example | 500 | 5.0 | 5.0 | 5.0 | Presence |
| 19 | Comparative example | 580 | 20.0 | 20.0 | 20.0 | Presence |
| 20 | Comparative example | 510 | 20.0 | 20.0 | 20.0 | Presence |
| 21 | Invention example | 540 | 20.0 | 20.0 | 20.0 | Presence |
| 22 | Invention example | 580 | 15.0 | 15.0 | 15.0 | Presence |
| 23 | Comparative example | 540 | 20.0 | 20.0 | 20.0 | Presence |
| 24 | Comparative example | 540 | 20.0 | 20.0 | 20.0 | Absence |
| 25 | Invention example | 550 | 20.0 | 20.0 | 20.0 | Presence |
| 26 | Invention example | 550 | 23.7 | 20.0 | 30.0 | Presence |
| 27 | Invention example | 550 | 20.0 | 20.0 | 20.0 | Presence |
| 28 | Invention example | 560 | 20.0 | 20.0 | 20.0 | Presence |
| 29 | Invention example | 560 | 23.6 | 20.0 | 30.0 | Presence |
| 30 | Invention example | 560 | 15.0 | 15.0 | 15.0 | Presence |
| 31 | Invention example | 560 | 23.6 | 20.0 | 30.0 | Presence |
| 32 | Invention example | 560 | 20.0 | 20.0 | 20.0 | Presence |
| 33 | Invention example | 580 | 20.0 | 20.0 | 20.0 | Presence |
| 34 | Comparative example | 600 | 20.0 | 20.0 | 20.0 | Presence |

TABLE 1-continued

| | Manufacturing method Post-Heat treatment | | Chemical composition (mass %) of plating layer Remainder: Zn and impurities | | | | | | | One side plating layer |
|---|---|---|---|---|---|---|---|---|---|---|
| | Time to start of heat treatment | Temperature | | | | | | Other | | adhesion amount |
| No. | (h) | (° C.) | Al | Mg | Si | Ca | Fe | Kinds | Total value | (g/m²) |
| 1 | <0.5 | 120 | <u>4.50</u> | 5.00 | 0.05 | 0.10 | 0.20 | — | 0.00 | 40 |
| 2 | <0.5 | 120 | 6.00 | <u>0.00</u> | 0.05 | 0.10 | 0.10 | Pb: 0.01 | 0.01 | 40 |
| 3 | <0.5 | 120 | 6.00 | 3.00 | 0.05 | 0.03 | 0.20 | — | 0.00 | 39 |
| 4 | <0.5 | 120 | 6.00 | 3.00 | 0.05 | 0.03 | 0.20 | — | 0.00 | 39 |
| 5 | <0.5 | 120 | 10.00 | 3.00 | 0.05 | <u>0.00</u> | 0.10 | — | 0.00 | 40 |
| 6 | <0.5 | 170 | 10.00 | 3.00 | 0.20 | <u>0.10</u> | 0.00 | — | 0.00 | 45 |
| 7 | 1.0 | 170 | 10.00 | 3.00 | 0.20 | 0.10 | 0.00 | — | 0.00 | 50 |
| 8 | <0.5 | 120 | 10.00 | 5.00 | 0.10 | 0.10 | 0.20 | — | 0.00 | 40 |
| 9 | <0.5 | 120 | 15.00 | 6.00 | 0.10 | 0.10 | 0.10 | Mn: 0.001 | 0.001 | 60 |
| 10 | 2.0 | 120 | 15.00 | 6.00 | 0.10 | 0.10 | 0.10 | — | 0.00 | 55 |
| 11 | <0.5 | 120 | 15.00 | 6.00 | 0.10 | 0.10 | 0.20 | Sr: 0.01 | 0.01 | 50 |
| 12 | 24 | 50 | 20.00 | 5.00 | 0.20 | 0.20 | 0.20 | — | 0.00 | 50 |
| 13 | <0.5 | 120 | 20.00 | 7.00 | 0.20 | 0.20 | 0.20 | Ni: 0.20 | 0.20 | 40 |
| 14 | 3.0 | 120 | 20.00 | 7.00 | 0.20 | 0.20 | 0.20 | Ni: 0.20 | 0.20 | 40 |
| 15 | 5.0 | 120 | 20.00 | 7.50 | 0.20 | 0.20 | 0.20 | — | 0.00 | 40 |
| 16 | <0.5 | 120 | 20.00 | 10.00 | 0.00 | 0.20 | 0.10 | Sb: 0.05 | 0.05 | 40 |
| 17 | <0.5 | 50 | 20.00 | 5.00 | 0.20 | 0.20 | 0.20 | — | 0.00 | 46 |
| 18 | <0.5 | 120 | 20.00 | 7.00 | 0.20 | 0.20 | 0.10 | — | 0.00 | 40 |
| 19 | <0.5 | 120 | 20.00 | <u>13.00</u> | 0.20 | 0.20 | 0.10 | — | 0.00 | 45 |
| 20 | <0.5 | 120 | 21.00 | <u>8.00</u> | <u>3.50</u> | 0.20 | 0.30 | — | 0.00 | 45 |
| 21 | <0.5 | 220 | 23.00 | 8.00 | <u>0.30</u> | 0.40 | 0.10 | Sn: 0.01 | 0.01 | 45 |
| 22 | <0.5 | 120 | 23.00 | 8.00 | 1.00 | 0.50 | 0.20 | Ti: 0.01 | 0.01 | 40 |
| 23 | <0.5 | 120 | 23.00 | 8.10 | 0.20 | 2.50 | 0.20 | — | 0.00 | 45 |
| 24 | <0.5 | — | 23.00 | 8.00 | 0.20 | <u>0.50</u> | 0.10 | — | 0.00 | 45 |
| 25 | <0.5 | 120 | 26.00 | 6.50 | 0.30 | 0.40 | 0.30 | Pb: 0.05 | 0.05 | 30 |
| 26 | <0.5 | 120 | 26.00 | 6.50 | 0.30 | 0.40 | 0.30 | — | 0.00 | 30 |
| 27 | 22 | 120 | 26.00 | 5.50 | 0.30 | 0.30 | 0.10 | Cu: 0.005 | 0.005 | 35 |
| 28 | <0.5 | 120 | 30.00 | 6.00 | 0.30 | 0.40 | 0.10 | — | 0.00 | 35 |
| 29 | <0.5 | 120 | 30.00 | 6.00 | 0.30 | 0.40 | 0.10 | — | 0.00 | 35 |
| 30 | <0.5 | 120 | 30.00 | 5.70 | 0.40 | 0.30 | 0.20 | — | 0.00 | 35 |
| 31 | <0.5 | 120 | 30.00 | 6.00 | 0.40 | 0.30 | 0.20 | — | 0.00 | 50 |
| 32 | <0.5 | 120 | 30.00 | 2.00 | 0.40 | 0.30 | 0.20 | Cr: 0.015 | 0.015 | 105 |
| 33 | <0.5 | 120 | 35.00 | 8.00 | 0.45 | 0.10 | 0.20 | — | 0.00 | 40 |
| 34 | <0.5 | 120 | <u>40.00</u> | 3.00 | 0.50 | 0.56 | 0.20 | — | 0.00 | 45 |

The underline indicates a value outside the range of the present invention.

With respect to the obtained plated steel sheet, the area ratio of each phase in the plating phase, the number density of the Ca-based intermetallic compound having a circle equivalent diameter of 0.10 μm or smaller and the Ca-based intermetallic compound having a circle equivalent diameter of 0.07 μm or smaller in the MgZn₂ phase, the thickness of the alloy layer, and the thickness of the internal oxidation layer were measured by the methods described above.

Further, with respect to the obtained plated steel sheets, the end surface corrosion resistance and the workability were evaluated by methods, which will be described later.

[End Surface Corrosion Resistance]

A sample of 50×100 mm was taken from the plated steel sheet, Zn phosphoric acid treatment (SD5350 system: Nippon Paint Industrial Coatings Co., Ltd. standard) was performed, and then electrodeposition coating (PN110 Powernics Gray: Nippon Paint Industrial Coatings Co., Ltd. standard) was performed so as to obtain a thickness of 20 μm, and baking was performed at a baking temperature of 150° C. for 20 minutes. This coated plated steel sheet (the plated steel sheet subjected to electrodeposition coating) was subjected to a combined cycle corrosion test in accordance with JASO (M609-91) to measure the maximum swelling width at three points from the sample end surface, and the average value is calculated to evaluate corrosion resistance after painting.

In a case where the number of cycles of JASO (M609-91) described above is 150 cycles and the coating film swelling width from the end surface is less than 1.0 mm, it was rated as "AAA", in a case where the coating film swelling width is less than 1.5 mm, it was rated as "AA", in a case where the coating film swelling width is in a range of 1.5 to 2.5 mm, it was rated as "A", and in a case where the coating film swelling width exceeds 2.5 mm, it was rated as "B".

[Workability]

The workability of the plating layer was evaluated by powdering resistance.

A plated steel sheet was cut into a size of 40 mm (C)×100 mm (L)×0.8 mm (t), and this was bent 60° at 5R with the C direction as a bending axis direction by using a V bending tester manufactured by Hoden Seimitsu Kako Kenkyusho Co., Ltd., and then evaluated from the 5-point average value of a peeling width of the plating layer generated by tape peeling.

Specifically, in a case where no peeling occurs, it was rated as "AA", in a case where the average peeling width is in a range of 0.1 to 0.5 mm, it was rated as "A", and in a case where the average peeling width exceeds 0.5 mm, it was rated as "B".

The results are shown in Table 2.

TABLE 2

| | | Plating layer | | | | | |
|---|---|---|---|---|---|---|---|
| | | MgZn$_2$ phase | | | | | |
| No. | Classification | Area % | Ca-based intermetallic compound phase of 0.10 μm or less Number density (piece/(μm × μm)) | Ca-based intermetallic compound phase of 0.10 μm or less Number density (piece/(μm × μm)) | (Al—Zn) phase area % | Ternary eutectic structure area % | Mg$_2$Si phase Circle-equivalent diameter (μm) |
| 1 | Comparative example | 25 | 0 | 0 | 10 | 65 | — |
| 2 | Comparative example | 0 | 0 | 0 | 12 | 88 | — |
| 3 | Invention example | 26 | 6 | 0 | 16 | 58 | — |
| 4 | Invention example | 25 | 6 | 6 | 16 | 59 | — |
| 5 | Comparative example | 13 | 0 | 0 | 0 | 87 | — |
| 6 | Invention example | 33 | 3 | 0 | 30 | 37 | — |
| 7 | Invention example | 33 | 3 | 3 | 31 | 36 | — |
| 8 | Invention example | 39 | 8 | 0 | 31 | 30 | — |
| 9 | Invention example | 43 | 12 | 0 | 41 | 16 | — |
| 10 | Invention example | 44 | 12 | 9 | 40 | 16 | — |
| 11 | Invention example | 44 | 15 | 0 | 43 | 13 | — |
| 12 | Comparative example | 40 | 0 | 0 | 44 | 16 | — |
| 13 | Invention example | 40 | 13 | 0 | 42 | 18 | — |
| 14 | Invention example | 41 | 13 | 10 | 42 | 17 | — |
| 15 | Invention example | 49 | 14 | 0 | 41 | 10 | — |
| 16 | Invention example | 55 | 13 | 0 | 34 | 5 | — |
| 17 | Comparative example | 38 | 0 | 0 | 44 | 18 | — |
| 18 | Comparative example | 45 | 0 | 0 | 43 | 7 | — |
| 19 | Comparative example | 70 | 11 | 0 | 25 | 5 | — |
| 20 | Comparative example | 35 | 0 | 0 | 43 | 12 | 12.0 |
| 21 | Invention example | 48 | 2 | 0 | 45 | 7 | — |
| 22 | Invention example | 49 | 12 | 0 | 43 | 4 | 1.9 |
| 23 | Comparative example | 83 | 0 | 0 | 0 | 6 | — |
| 24 | Comparative example | 48 | 0 | 0 | 15 | 37 | — |
| 25 | Invention example | 44 | 13 | 0 | 49 | 7 | — |
| 26 | Invention example | 43 | 13 | 10 | 49 | 8 | — |
| 27 | Invention example | 46 | 10 | 0 | 50 | 4 | — |

TABLE 2-continued

| No. | | | | | | |
|---|---|---|---|---|---|---|
| 28 | Invention example | 44 | 11 | 0 | 53 | 3 | — |
| 29 | Invention example | 42 | 11 | 8 | 53 | 5 | — |
| 30 | Invention example | 39 | 8 | 0 | 55 | 6 | — |
| 31 | Invention example | 40 | 7 | 5 | 55 | 5 | — |
| 32 | Invention example | 32 | 7 | 0 | 65 | 3 | — |
| 33 | Invention example | 20 | 7 | 0 | 70 | 10 | — |
| 34 | Comparative example | 25 | <u>0</u> | 0 | 75 | 0 | — |

| | Plating layer | | | | Internal | Evaluation | |
|---|---|---|---|---|---|---|---|
| | | Other intermetallic compound | | | | | |
| No. | $Mg_2Si$ phase Area % | Circle-equivalent diameter (μm) | Area % | Alloy layer Thickness (μm) | oxidation layer Thickness (μm) | End surface corrosion resistance | Workability |
| 1 | 0.0 | — | 0.0 | 0.2 | 1.1 | B | A |
| 2 | 0.0 | — | 0.0 | 0.2 | 1.2 | B | A |
| 3 | 0.0 | 0.0 | 0.1 | 0.2 | 1.5 | A | A |
| 4 | 0.0 | 0.0 | 0.1 | 0.2 | 1.5 | AA | A |
| 5 | 0.0 | 0.4 | 0.1 | 0.2 | 2.0 | B | A |
| 6 | 0.0 | — | 0.0 | 0.3 | 1.5 | A | AA |
| 7 | 0.0 | — | 0.0 | 0.3 | 1.5 | AA | AA |
| 8 | 0.0 | — | 0.0 | 0.3 | 2.0 | A | AA |
| 9 | 0.0 | 0.2 | 0.2 | 0.2 | 1.0 | AAA | AA |
| 10 | 0.0 | — | 0.0 | 0.2 | 1.0 | AAA | AA |
| 11 | 0.0 | 2.1 | 0.2 | 0.3 | 1.9 | AAA | AA |
| 12 | 0.0 | 0.0 | 0.2 | 0.2 | 1.8 | B | AA |
| 13 | 0.0 | 0.4 | 0.1 | 0.3 | 2.0 | AAA | AA |
| 14 | 0.0 | — | 0.0 | 0.2 | 1.8 | AAA | AA |
| 15 | 0.0 | 0.2 | 0.2 | 0.3 | 1.4 | AAA | AA |
| 16 | 0.0 | 3.0 | 6.2 | 1.6 | 2.0 | AAA | AA |
| 17 | 0.0 | 0.0 | 0.3 | 0.2 | 2.0 | B | AA |
| 18 | 0.0 | 0.5 | 5.0 | 0.3 | 1.5 | B | AA |
| 19 | 0.0 | — | 0.0 | 0.2 | 2.1 | A | B |
| 20 | 10.0 | — | 0.0 | 0.3 | 2.2 | B | B |
| 21 | 0.0 | — | 0.0 | 0.2 | 2.0 | AA | AA |
| 22 | 4.0 | 0.1 | 0.2 | 0.4 | 2.0 | AAA | AA |
| 23 | 0.0 | 2.5 | 11.0 | 0.3 | 2.0 | A | B |
| 24 | 0.0 | 0.0 | 0.2 | 0.3 | 2.0 | B | A |
| 25 | 0.0 | 0.3 | 0.2 | 0.4 | 1.9 | AAA | AA |
| 26 | 0.0 | — | 0.0 | 0.4 | 1.8 | AAA | AA |
| 27 | 0.0 | 0.4 | 0.2 | 0.4 | 1.2 | AAA | AA |
| 28 | 0.0 | — | 0.0 | 0.6 | 1.1 | AAA | AA |
| 29 | 0.0 | — | 0.0 | 0.6 | 1.1 | AAA | AA |
| 30 | 0.0 | 0.4 | 0.2 | 0.6 | 1.3 | AA | AA |
| 31 | 0.0 | — | 0.0 | 0.7 | 1.4 | AAA | AA |
| 32 | 0.0 | 0.6 | 0.2 | 0.8 | 1.4 | AA | AA |
| 33 | 0.0 | — | 0.0 | 1.0 | 1.5 | AA | AA |
| 34 | 0.0 | — | 0.0 | 2.1 | 2.2 | B | A |

The underline indicates a value outside the range of the present invention.

As can be seen from the results in Tables 1 and 2, in Nos. 3, 4, 6 to 11, 13 to 16, 21, 22, and 25 to 33, which are the present invention examples, the chemical composition and the area ratio of the $MgZn_2$ phase in the cross section in the thickness direction were within the range of the present invention, and the $MgZn_2$ phase contained a Ca-based intermetallic compound. Therefore, the end surface corrosion resistance and the workability were exceptional.

On the other hand, in Nos. 1, 2, 5, 12, 17 to 20, 23, 24, and 34, which are comparative examples, one or more of the chemical composition, the area ratio of the $MgZn_2$ phase in the cross section in the thickness direction, and the number density of the Ca-based intermetallic compound in the $MgZn_2$ phase were out of the range of the present invention. As a result, either the end surface corrosion resistance or the workability was inferior.

What is claimed is:
1. A hot-dip Zn-based plated steel sheet comprising:
a steel sheet; and
a plating layer formed on at least part of a surface of the steel sheet,
wherein the plating layer has a chemical composition that includes, by mass %,
Al: 6.00% to 35.00%,
Mg: 2.00% to 12.00%,
Ca: 0.005% to 2.00%,
Si: 0% to 2.00%,

Fe: 0% to 2.00%,
Sb: 0% to 0.50%,
Sr: 0% to 0.50%,
Pb: 0% to 0.50%,
Sn: 0% to 1.00%,
Cu: 0% to 1.00%,
Ti: 0% to 1.00%,
Ni: 0% to 1.00%,
Mn: 0% to 1.00%,
Cr: 0% to 1.00%, and
a remainder: Zn and impurities,
the plating layer has an area ratio of a $MgZn_2$ phase in a range of 15% to 60% in a cross section in a thickness direction, and
the $MgZn_2$ phase includes a Ca-based intermetallic compound having a circle equivalent diameter of 0.10 μm or smaller.

2. The hot-dip Zn-based plated steel sheet according to claim 1, wherein the chemical composition of the plating layer contains one or more selected from the group consisting of, by mass %,
Al: 11.00% to 30.00%,
Mg: 5.00% to 10.00%, and
Ca: 0.10% to 1.00%.

3. The hot-dip Zn-based plated steel sheet according to claim 1, wherein a number density of the Ca-based intermetallic compound that is included in the $MgZn_2$ phase is 10 pieces/$\mu m^2$ or more.

4. The hot-dip Zn-based plated steel sheet according to claim 2, wherein a number density of the Ca-based intermetallic compound that is included in the $MgZn_2$ phase is 10 pieces/$\mu m^2$ or more.

5. The hot-dip Zn-based plated steel sheet according to claim 1, wherein an alloy layer that includes an Al—Fe-based intermetallic compound and has an average thickness in a range of 0.05 to 3.0 μm is provided between the plating layer and the steel sheet.

6. The hot-dip Zn-based plated steel sheet according to claim 2, wherein an alloy layer that includes an Al—Fe-based intermetallic compound and has an average thickness in a range of 0.05 to 3.0 μm is provided between the plating layer and the steel sheet.

7. The hot-dip Zn-based plated steel sheet according to claim 3, wherein an alloy layer that includes an Al—Fe-based intermetallic compound and has an average thickness in a range of 0.05 to 3.0 μm is provided between the plating layer and the steel sheet.

8. The hot-dip Zn-based plated steel sheet according to claim 4, wherein an alloy layer that includes an Al—Fe-based intermetallic compound and has an average thickness in a range of 0.05 to 3.0 μm is provided between the plating layer and the steel sheet.

9. The hot-dip Zn-based plated steel sheet according to claim 1, wherein the steel sheet has an internal oxidation layer in a surface layer area on a side of the plating layer.

10. The hot-dip Zn-based plated steel sheet according to claim 2, wherein the steel sheet has an internal oxidation layer in a surface layer area on a side of the plating layer.

11. The hot-dip Zn-based plated steel sheet according to claim 3, wherein the steel sheet has an internal oxidation layer in a surface layer area on a side of the plating layer.

12. The hot-dip Zn-based plated steel sheet according to claim 4, wherein the steel sheet has an internal oxidation layer in a surface layer area on a side of the plating layer.

13. The hot-dip Zn-based plated steel sheet according to claim 5, wherein the steel sheet has an internal oxidation layer in a surface layer area on a side of the alloy layer.

14. The hot-dip Zn-based plated steel sheet according to claim 6, wherein the steel sheet has an internal oxidation layer in a surface layer area on a side of the alloy layer.

15. The hot-dip Zn-based plated steel sheet according to claim 7, wherein the steel sheet has an internal oxidation layer in a surface layer area on a side of the alloy layer.

16. The hot-dip Zn-based plated steel sheet according to claim 8, wherein the steel sheet has an internal oxidation layer in a surface layer area on a side of the alloy layer.

\* \* \* \* \*